United States Patent [19]

Parisi

[11] Patent Number: 5,037,120

[45] Date of Patent: Aug. 6, 1991

[54] WHEELCHAIR MANUAL DRIVE MECHANISM

[76] Inventor: Paul J. Parisi, P.O. 547, Flagstaff, Ariz. 86002

[21] Appl. No.: 457,231

[22] Filed: Dec. 26, 1989

[51] Int. Cl.[5] .................... B62M 1/14

[52] U.S. Cl. .................... 280/250.1; 74/413; 74/421 R; 297/DIG. 4

[58] Field of Search .................... 280/250.1, 248, 249, 280/647, 657; 297/DIG. 4; 74/413, 421 R, 421 A

[56] References Cited

U.S. PATENT DOCUMENTS

| | | | |
|---|---|---|---|
| 292,179 | 1/1884 | Riley | 280/249 |
| 2,572,149 | 10/1951 | Hind et al. | 297/DIG. 4 |
| 3,253,837 | 5/1966 | Johnson | 230/249 X |
| 3,975,969 | 8/1976 | Osborn et al. | 74/413 X |
| 4,274,650 | 6/1981 | Gilles | 280/249 X |
| 4,274,651 | 6/1981 | Dumont | 280/250.1 |

FOREIGN PATENT DOCUMENTS

| | | | |
|---|---|---|---|
| 64807 | 9/1946 | Denmark | 280/304.1 |
| 2563170 | 10/1985 | France | 280/250.1 |

*Primary Examiner*—Charles A. Marmor
*Assistant Examiner*—Alan M. Kagen
*Attorney, Agent, or Firm*—Albert O. Cota

[57] ABSTRACT

A hand operated propulsion drive mechanism for a wheelchair which has a driven gear (20) attached to the wheel of the wheelchair. A drive gear (26) is rotatably mounted to a support arm bracket (30) and intermeshes teeth with the driven gear. A hand crank (36) with a handle (40) allows a disabled person to propel the wheelchair by rotating the handle. A protective disc (38) covers the drive gear and also becomes part of the hand crank further allowing adjustment of the rotational radius of the drive using a slot (46) and removable mounting hardware. A second embodiment adds additional drive gears (26') to relocate the hand crank at different positions and the support arm bracket (30') is wide enough to cover the gears.

2 Claims, 4 Drawing Sheets

WHEELCHAIR MANUAL DRIVE MECHANISM

TECHNICAL FIELD

The present invention relates to drive mechanisms for wheelchairs used by disabled persons in general, and more specifically to a manually operated gear driven apparatus providing hand manipulated propulsion for each wheel.

BACKGROUND ART

Previously, many types of drives and different configured wheelchairs have been in use to provide an effective means of self-propulsion by disabled persons. The conventional type of wheelchair employed today utilizes an extended rim or rail protruding from each fixed wheel allowing the user to grasp the rim and propel the chair by moving the wheel directly by hand grasping small segments at a time. Conversely, many types of hand cranks have been employed using manual energy transmitted to the wheels generally by chains. Others have developed mechanisms that provide hand operated wheels driving the wheelchairs fixed support wheels, again, by chains. Still, others have employed levers with gears, ratchets, clutches, etc., in an attempt to transmit human energy from upper body limbs to drive wheelchairs.

A search of the prior art did not disclose any patents that read directly on the claims of the instant invention, however, the following U.S. patents were considered related:

| U.S. Pat. No. | Inventor | Filing Date |
|---|---|---|
| 4,762,332 | Seol | Aug. 9, 1988 |
| 4,758,013 | Agrillo | Jul. 19, 1988 |
| 4,732,402 | Lambert | Mar. 22, 1988 |
| 4,682,784 | Anderson | Jul. 28, 1987 |
| 4,560,181 | Herron | Dec. 24, 1985 |
| 4,274,651 | Dumont | Jun. 23, 1981 |
| 4,044,850 | Winsor | Aug. 30, 1977 |
| 3,442,532 | Gardener et al | May 6, 1969 |
| 2,946,602 | Lee | Jul. 26, 1960 |
| 2,452,886 | Wood | Nov. 2, 1948 |

Agrillo teaches a hand crank powered wheelchair with forward, coast, reverse, and braking capability. Each hand crank is independent of the other. A clutch and brake are disposed in the hub of each rear wheel. A reverse lever selects the brake of reverse mode of operation. A crank arm transmits the rotational power via a drive chain with a drive sprocket having a handle and a driven sprocket integral with the coaster brake. In another embodiment a driveshaft and beveled gears are employed to transmit the rotational power.

Lambert utilizes a hand wheel attached by a chain transmission to a driving wheel with the chair back and leg supports in the conventional position. The hand wheels are substantially larger than the drive wheels, allowing the disabled person to move the wheelchair with the least possible effort. This arrangement and use of the hand wheel allows the wheelchair to be propelled on wet or dirty ground without soiling the persons hands or clothing.

Dumont, on the other hand, employs a similar mechanical drive using a flexible chain drive and a rotatable hand crank. The drive includes a clutch assembly that is responsive to the cam drivingly connecting the hand crank to the main wheel. The clutch is engaged by moving a handle to a drive position, thus cammingly engaging the clutch, thereby driving the wheel. Further, a neutral position permits the drive wheel to coast conserving the operators energy when not required.

Gardner et al is concerned with improvements in the foldability and portability of a wheelchair along with a chain driven propulsion system that does not require the user to exert excessive force in negotiating normal inclines using a continuous chain between relatively small sprockets.

Wood employs a hand crank to drive one wheel and a steering handle on an opposite wheel. The hand crank is directly connected to a sprocket wheel and the chain drives a similiar but larger sprocket wheel secured to the hub of the right rear wheel. The embodiment is so arranged as to allow construction of wood.

For background purposes and as indicative of the art to which the invention relates reference may be made to the remaining cited patents, most of which employ a lever controlled mechanism manipulated by the operator for propulsion of the wheelchair.

DISCLOSURE OF THE INVENTION

It may be clearly seen from the prior art that much effort has been given to overcome the major problem that has existed with wheelchairs for some time relative to the necessity of touching the rear wheels when manually propelling the device. Even when an extending hand rim or rail is attached to the drive wheel it is still in very close proximity allowing dirt, mud, and debris to be transferred to the users hands and clothing, leaving the operator very unsightly and offensive to themselves and others. As previously described, prior art has attempted to solve this problem using drive mechanisms with hand cranks and levers, however, the complexity of the apparatus has not allowed universal acceptance by the masses due to its intricacy and expense.

It is, therefore, a primary object of the invention to provide a simple drive mechanism that allows complete control of the wheelchair from a pair of directly driven hand cranks using intermeshing gears to transmit rotary energy from the user to the wheels without touching the weight supporting wheel on the wheelchair at all. The use of gears, instead of chains used by prior art, allows direct positive control without play or backlash. This advantage is clearly seen when turning and reversing directions, as constant control is provided without freewheeling clutches and brakes, etc. in previous use. Certainly in comparison with a wheelchair having a drive rim in close proximity to the rubber wheels, the invention allows ones hands to always be in complete control, whereas the drive rim is grasped by hand and let go in a disruptive manner by each hand, in order to get another grip at a different location on the rim. Further, commonly used wheelchairs require a stop and lock brake movement or a release brake and quickly regain control when on an incline, where the invention employs a smooth, relatively effortless controlled maneuver on any angular surface.

An important object of the invention is the mechanical advantage of the drive mechanism allowing an optimum speed to crank the driven wheel and the location of the hand crank according to the best ergonomic considerations. Furthermore, existing manual powered wheelchairs with rims are notoriously inefficient, having considerable lost and wasted motion. The power stroke is only approximately one sixth of a revolution requiring ones hands and arms to return to the starting position after each power stroke. During this return stroke, energy is consumed but not transmitted to the drive wheels as the hands return empty to the original position. Not only is this inefficient, but during this time the wheelchair is out of control and can be particularly dangerous when ascending or descending a ramp or other irregular terrain. As power originates from the hips and mid-line of the body, a conventional wheelchair user must reach behind his back to grasp the drive rim in order to get sufficient arc of a circle to propel the wheelchair. If one does not do this, only a small movement will be directed to the wheels and it will require countless repetitions to propel the wheelchair forward. This required awkward movement does place the user in a position of weakness as the further the arms go behind ones back the less power they have.

The actual power stroke, therefore, begins at a point of weakness and gathers momentum until it approaches a point where there is some force generated and then it is completed only to have to return to the original point of weakness, not attaining any fluidity or muscular efficiency.

The present invention allows the stroke to always be in a position of power, as it originates near the hips or just slightly forward of them and goes through a natural and efficient motion keeping the wrists and forearms in one line and circulating between the hips and knees. When seated, this is a tremendously powerful, efficient and natural movement.

Furthermore, in the prior art approach, the wrist is turned down at an angle to grasp the drive rim. This angled position between wrist and forearm is weak and tiring to the user, while by contrast, in the invention the wrist and forearms are locked in a direct line creating an optimum position to assure maximum efficiency and comfort.

Another object of the invention is the ease of adaptation to most wheelchairs available on today's market. As this invention simply replaces the hand driving rim on the main wheel with a gear on the wheel and a second mating drive gear with a hand crank, any type of wheelchair may be easily equipped. This adaptation includes standard or lightweight types of wheelchairs folding or rigid styles and other variations thereof.

Still another object of the invention allows its use on originally manufactured wheelchairs, or it may be furnished in kit form for the aftermarket. According to the United States Government Bureau of Census report for 1984, of people 15 years of age and older, there are 7,959,000 people that cannot walk or move unaided. This number is increasing yearly due to birth defects, degenerative diseases, traumatic accidents, and aging. Thus, this improvement could basically change the mode of manual driving and the fact that existing wheelchairs may be retrofitted would be of great economic benefit to the public.

Yet another object of the invention allows the use of a simple option of adding a ratcheted spring loaded pawl to one of the gears preventing the wheelchair from rolling backwards on an incline. Normally, wheelchairs using the conventional hand propulsion on the main wheel may, on the return stroke, lose momentum or abruptly change directions on uneven surfaces and roll backwards or become out of control on an inclined ramp. The basic invention all but eliminates this problem, as the hands are always in mechanical contact with the wheels, however, if the disabled person chooses to stop on an incline, hand pressure must still be maintained. To simplify the operation even further, this elective device may be added and operates by impeding the wheel from reverse operation by locking the cam to the gear and yet allows forward rotation compressing the spring permitting the pawl jaw to easily ride over the teeth of the gear.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred and a second embodiment. Both embodiments are primarily designed alike, except for the inner or outer tooth arrangement of the gears.

Figure 1:
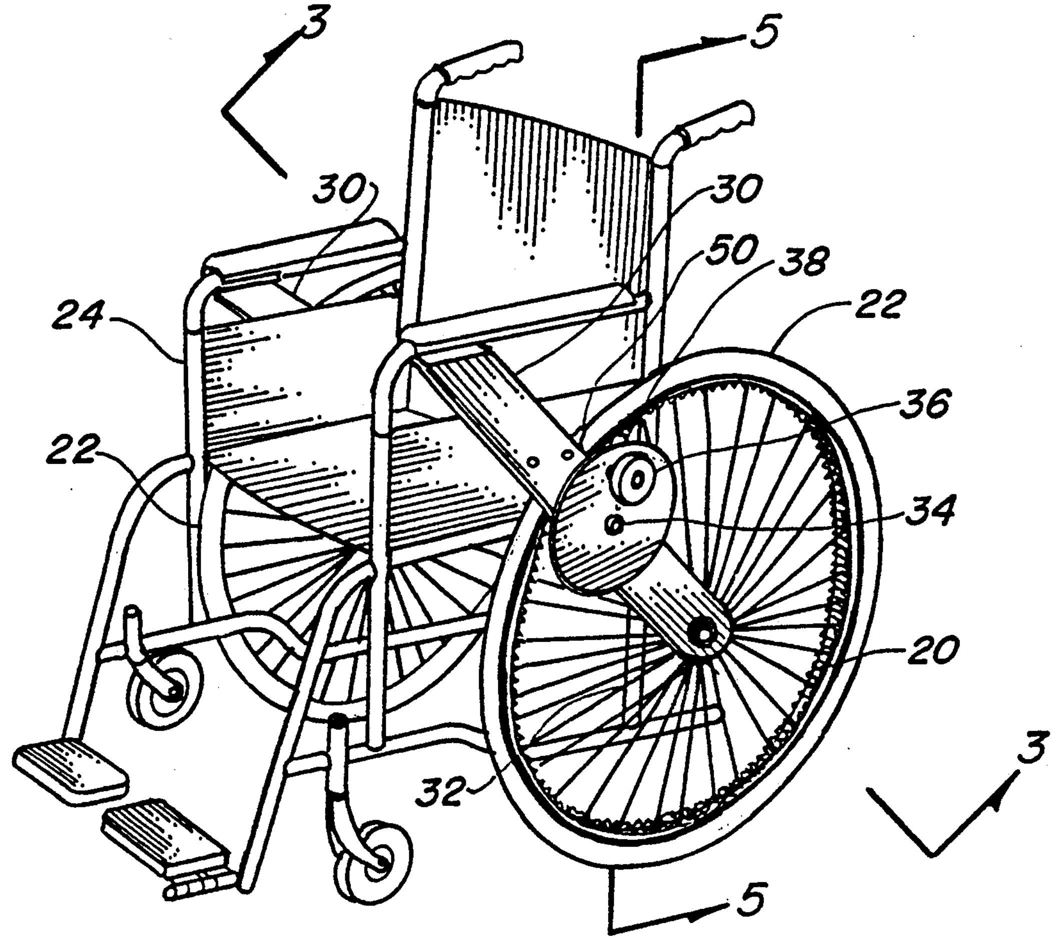
FIG. 1 is a partial isometric view of the preferred embodiment with the internal toothed drive gear.
Figure 2:
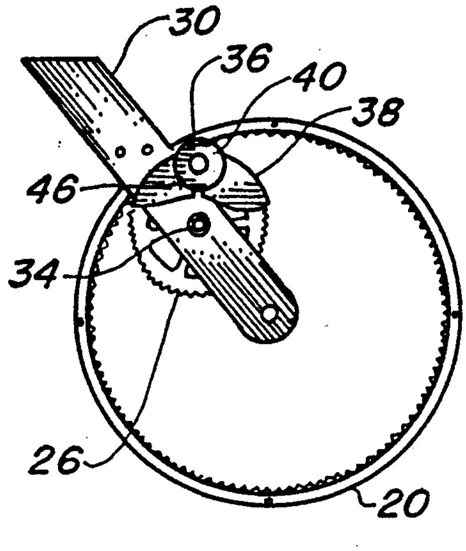
FIG. 2 is a side elevation view of the preferred embodiment completely removed from the wheelchair.
Figure 3:
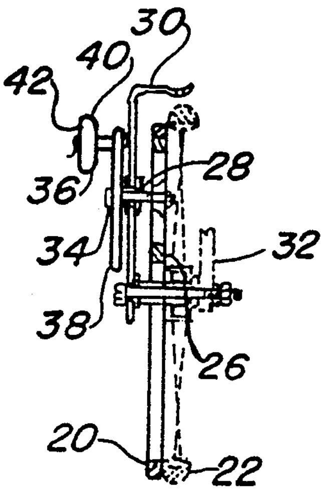
FIG. 3 is a cross-sectional view taken along lines 3—3 of FIG. 1 with the fixed wheel of the wheelchair shown in dashed lines.
Figure 4:
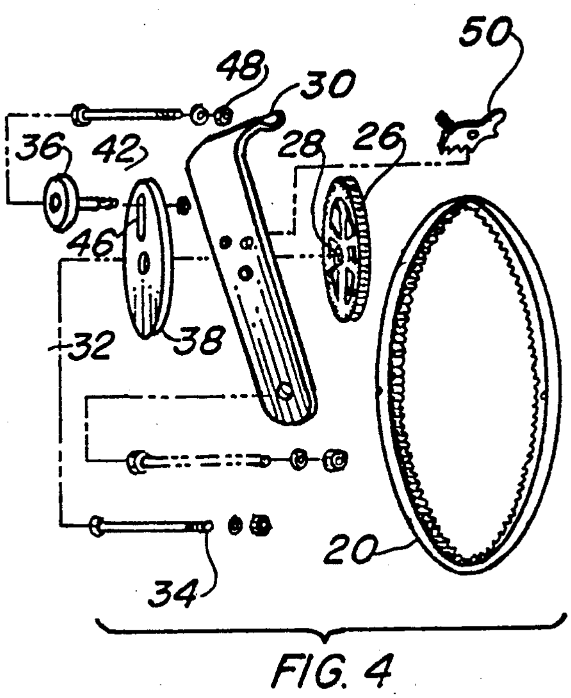
FIG. 4 is an exploded view of the preferred embodiment less the wheelchair.

The preferred embodiment, as shown in FIGS. 1 through 7, are comprised of driven ring gear 20 having internal teeth attached to the drive wheel 22 of a wheelchair 24. This ring gear 20 is permanently attached to the drive wheel 22 such that it rotates with the wheel. The diameter of the ring gear 20, relative to the wheel, may be just slightly smaller than the wheel, as illustrated in FIGS. 1 and 2 attached adjacent to the rim, or in place of the manual operating rim on conventional wheelchairs. The gear 20 may also be considerably smaller in diameter and attached to the spokes depending upon the desired gear ratio. In any event, the teeth are inwardly depending and the gear 20 is securely joined to the wheel.

A drive gear 26 having external teeth is rotatably located in the upper quadrant of the ring gear 20 intermeshing teeth in a driving relationship. Since the diametrical pitch is the same, the gear teeth are intermittently contiguous with each other, therefore, this relationship simply transfers the rotational force from one gear to the other allowing the axis to be moved into a position convenient to the disabled person. The type of gearing is not limited to the diametrical pitch system for spur gears or even helical gears, as any type compatible with each other is acceptable. The material may be any type having suitable structural integrity for the application, such as thermoplastic, cast metals of any type, with steel or aluminum being preferred. A bearing 28 is preferably employed on the drive gear 26 allowing a minimum of friction during the rotation. Sintered bronze that is oil impregnated or ball bearings are acceptable for this bearing surface or if the gear is thermoplastic no specific bushing may be required. In any event, the gear 26 should be free to rotate without undue frictional resistance.

A support arm bracket 30 is attached to the wheelchair frame 32 parallel to the drive wheel 22. One end of the bracket 30 is fastened directly to the arm of the wheelchair frame and the other to the axle of the wheel 22, which is in turn, an extension of the frame. This arm 30 is basically flat with one end flanged to join with the upper portion of the frame and may be slightly dished to mate the adjoining structure or any appropriate complementary shape. The bottom end of the arm 30 interfacing with the wheel axle may also be configured to adapt to the structure, such as an offset, or the like, however, flat is preferred. The arm 30 functions as a structural support for the drive gear 26, illustrated in FIGS. 2, 3, and 4, and the gear is rotatably attached with a bolt 34, or the like, having a round shaft to which the above described bearing 28 is mounted. Any type of structure may be used for this arm 30, such as flat sheet metal, forged steel shape, extruded aluminum square tube, round thinwall tubing or the arm bracket may be the same material as used in the construction of the frame.

A hand crank 36 is pivotally supported by th drive gear 26 interfacing structurally with the arm bracket 30 providing a solid interface with the gear and the crank. This arrangement provides a means for rotating the fixed drive wheel 22 of the wheelchair 20 by simply manually rotating the hand crank 36 which, in turn, reciprocates the drive gear 26 and the driven ring gear 20 to propel the wheelchair.

Figure 5:
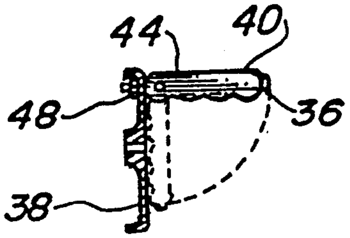
FIG. 5 is a cross-sectional view taken along lines 5—5 of FIG. 1 with the handle shown folded in phantom.
Figure 6:
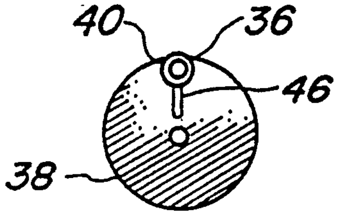
FIG. 6 is a side elevational view of the protective disc with an adjustable handle.
Figure 7:
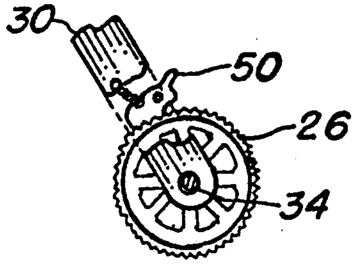
FIG. 7 is a side elevational view of the drive gear completely separate from the invention to which a ratcheted pawl has been attached.
Figure 8:
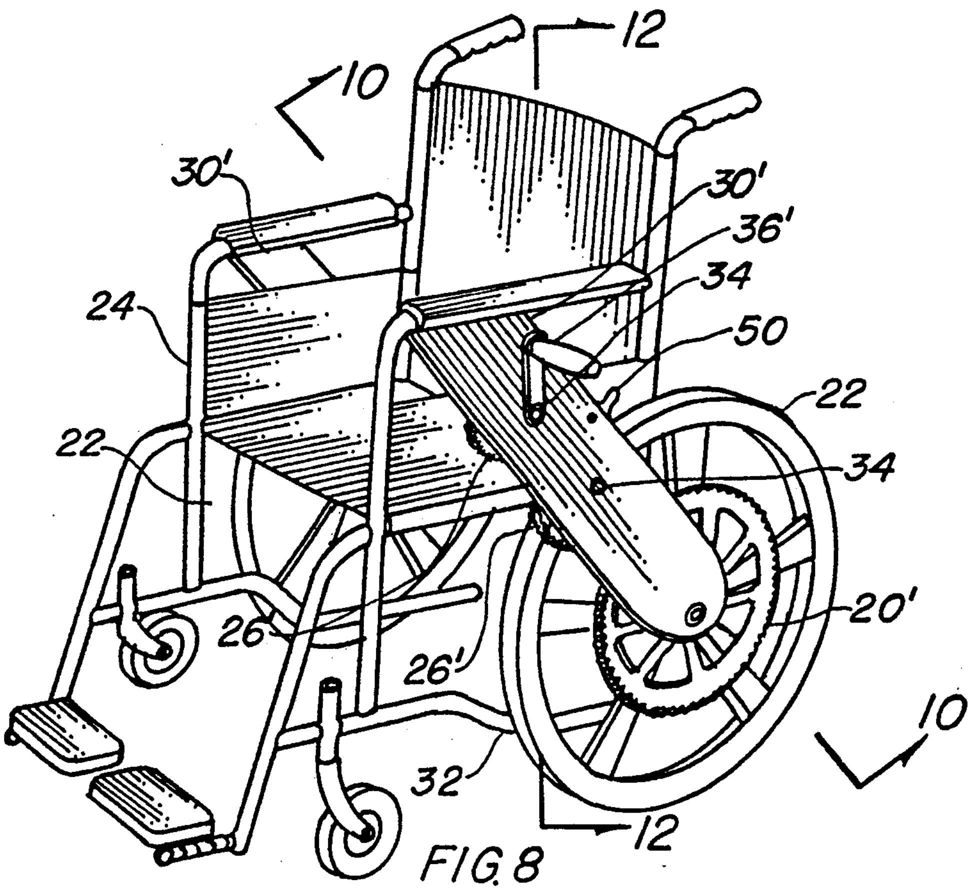
FIG. 8 is a partial isometric view of the second embodiment with the external toothed drive gears.
Figure 9:
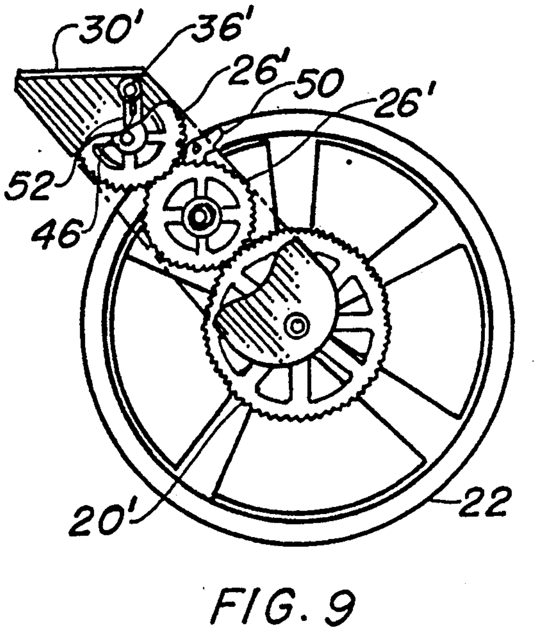
FIG. 9 is a side elevation view of the second embodiment completely removed from the wheelchair.
Figure 10:
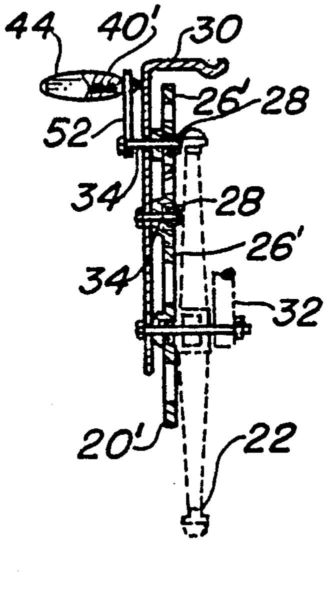
FIG. 10 is a cross-sectional view taken along lines 10—10 of FIG. 8 with the fixed wheel of the wheelchair shown in dashed lines.
Figure 11:
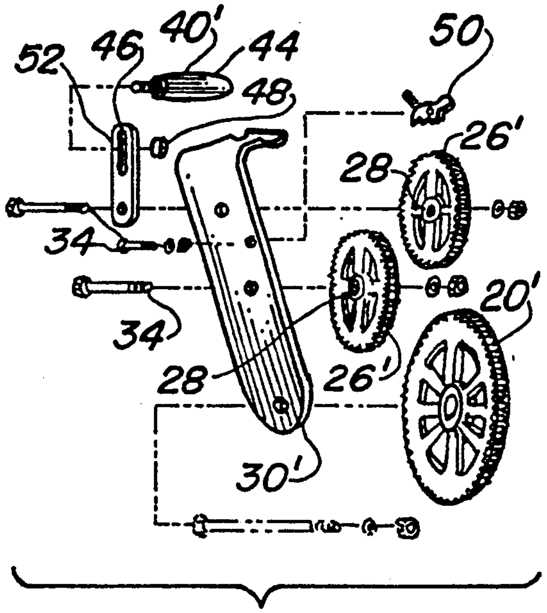
FIG. 11 is an exploded view of the second embodiment less the wheelchair.
Figure 12:
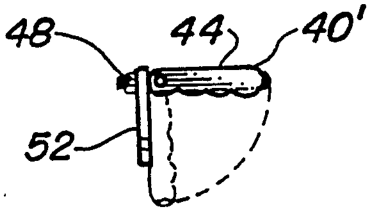
FIG. 12 is a cross-sectional view taken along lines 12—12 of FIG. 8 with the handle shown folded in phantom.
Figure 13:
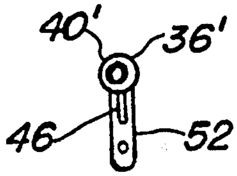
FIG. 13 is a side elevational view of the connecting member with an adjustable handle.
Figure 14:
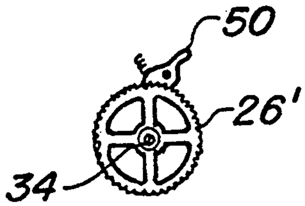
FIG. 14 is a side elevational view of the drive gear completely separate from the invention to which a ratcheted pawl has been attached.

In embodiments using a relatively narrow arm 30, as shown in FIGS. 1 through 7, a protective disc 38 with a pivotal handle 40 may be utilized as the hand crank 36. This combined shield and handle not only allows manual rotation but provides a barrier to shield the drive gear from the user when rotating the gear 26. In any event, the handle pivots allowing the user to maintain his grasp during the entire rotational cycle of the gear 26. The handle 40 may be round shaped 42, as shown in FIGS. 1 through 4, or cylindrical or oval shaped 44 with the latter configurations collapsing or pivot inwardly, as depicted in FIG. 5 if desired to enable the wheelchair to maneuver through narrow passageways or barriers when necessary. Another variation of the handle 40 is illustrated in FIG. 13 allowing the handle to be adjusted relative to the distance from the drive gear 26 axis allowing the user to change the rotational axis of the handle increasing or decreasing the lever arm of the hand crank 36. This adjustment is accomplished using a slot 46 in the disc 38 and a threaded fastener 48 on the handle 40.

As an accessory to the propulsion drive mechanism, a ratcheted pawl 50 may be added in contact with the drive gear 26 or ring gear 20 consisting of a spring loaded ratchet having teeth that mate with the gear The pawl 50 is so configured as to allow forward rotation of the wheel 22 and, yet, prevents the wheelchair from rolling backwards on an upward incline by jamming the teeth in one direction under the influence of the spring and riding freely in the other.

While a single wheeled drive mechanism has been described and may function for disabled persons with one arm, the preferred embodiment includes a drive on each wheel 22 allowing complete and positive control of the wheelchair 24.

The second embodiment is pictorially illustrated in FIGS. 8 through 11 and is basically the same in operation with its form changing only in relationship to the gears. By contrast, the driven gear 20′ has external teeth and is attached to the wheelchair drive wheel 22 preferably on the spokes or the wheel hub. While the function is identical, the method of attachment differs somewhat, however, either way the gear 20′ rotates with the wheel 22.

A plurality of drive gears 26′ having external teeth, as before, are drivingly connected to the driven gear 20′, except more than one is used. This arrangement of mating gears allows the position of the outboard gear to be higher relative to the users body providing an optimum location for disabled persons of short stature or to be more in line with the users central body mass. The gears 26′ may be of any combination of diameters which may increase or decrease the speed ratio of the drive to optimize the torque for the particular application. Although two gears 26′ are shown in the drawings, any number may be used with equal ease.

The support arm bracket 30′ in this configuration may be any size, however, it is preferred that the width is slightly broader than the drive gears 26′ eliminating the necessity of a separate protective disc. In other respects, the arm 30′ is identical in structure and attachment with the preferred embodiment.

The hand crank 36′ again functions in the same manner, except the protective disc 38 forming the attachment is replaced by a connecting member 52 that is attached on one end to the drive gear 26′ and to a handle 40′ on the other.

As it may be clearly seen in the accompanying drawings, the balance of the drive mechanism is the same as the preferred embodiment, similarly the drive mechanism may be employed on each wheel of the wheelchair 24.

To operate the invention, the disabled person sits in the wheelchair 24 much as one would sit in any chair, and reaches slightly forward, down, and to the side and grasps the handles 40 of the drive gear mechanism.

To make the wheelchair move forward, the person turns the handles 40 in a forward circular motion, or for reverse, the motion is reversed.

To make the wheelchair 24 turn to the right, the person turns the left hand drive wheel handle 40 forward and either holds the right handle stationary, or turns it in reverse, again turning to the left is the opposite motion.

To stop the wheelchair 24, the person reverses the direction of momentum by resisting or reversing the motion in which the drive mechanism is turning.

As the operators hands are in constant contact with the drive at all times, no lost or wasted motion or time is involved in the above maneuvers.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

What is claimed is:

1. A manual propulsion drive mechanism for a wheelchair used by disabled persons with the wheelchair having a structural frame, a pair of swivel wheels, and a pair of fixed drive wheels said mechanism comprising:

(a) a driven ring gear having internal teeth, attached to each wheelchair fixed drive wheel such that the gear rotates with said wheel;

(b) at least one drive gear having external teeth, intermeshing intimately with the internal teeth of said ring gear providing transmission of torque upon reciprocation of the drive gear;

(c) at least one support arm bracket attached to the wheelchair frame, juxtaposed to each fixed wheel, with the drive gear rotatably joined thereupon defining a structural platform to retain the drive gear; and (d) at least one hand crank pivotally supported by each bracket and engagingly affixed to each drive gear providing means for rotating the fixed wheels of the wheelchair upon reciprocation of said drive gear by manually rotating each hand crank transmitting manual energy to linearly propel the wheelchair;

said hand crank includably comprises an adjustable pivoting handle which is adjustable relative to the distance from the drive gear axis allowing a user to change the handle rotational radius increasing or decreasing a lever arm of the hand crank.

2. A manual propulsion drive mechanism for a wheelchair used by disabled persons with the wheelchair having a structured frame, a pair of swivel wheels, and a pair of fixed drive wheels comprising:

(a) a driven wheel gear having external teeth securely coupled to each wheelchair fixed drive wheel such that the gear rotates with said wheel;

(b) a plurality of drive gears having external teeth intermeshing intimately with both the external teeth of the driven wheel gear and their own teeth providing transmission of torque upon reciprocation of one of the drive gears;

(c) at least one support arm bracket attached to the wheelchair frame, juxtaposed to each fixed wheel with the drive gears rotatably joined thereupon defining a structureal platform to retain the drive gears; and (d) at least one hand crank pivotally supported by each bracket and engagingly affixed to one of the drive gears providing means for rotating the fixed wheels of the wheelchair upon reciprocation of a drive gear by manually rotating each hand crank transmitting manual energy to linearly propel the wheelchair, said hand crank includably comprises an adjustable pivoting handle which is adjustable relative to the distance from a drive gear axis allowing a user to change the handle rotational radius increasing or decreasing a lever arm of the hand crank.

* * * * *